United States Patent [19]

Fadgen, Jr.

[11] 3,896,043
[45] July 22, 1975

[54] NON-CYANIDE ALKALINE COMPOSITION FOR DISSOLVING NON-FERROUS METALS

[75] Inventor: Earl J. Fadgen, Jr., Clinton, Conn.

[73] Assignee: Enthone, Incorporated, West Haven, Conn.

[22] Filed: Aug. 27, 1973

[21] Appl. No.: 392,169

[52] U.S. Cl. ............ 252/186; 134/2; 156/18; 252/79.1; 252/79.5; 252/102; 252/103; 252/156; 423/32
[51] Int. Cl. ........ C23f 1/00; C23g 5/00; C23g 1/18
[58] Field of Search ......... 252/186, 79.1, 79.5, 102, 252/103, 364, 156; 423/32, 33, 513; 75/97 R; 156/18; 134/2, 6

[56] References Cited
UNITED STATES PATENTS

| | | | |
|---|---|---|---|
| 3,351,556 | 11/1967 | Tsourmas | 252/103 |
| 3,434,796 | 3/1969 | Colombo | 252/103 |
| 3,738,867 | 6/1973 | Franz | 252/102 |
| 3,790,489 | 2/1974 | Shoemaker et al. | 252/103 |

*Primary Examiner*—Benjamin R. Padgett
*Assistant Examiner*—Irwin Gluck
*Attorney, Agent, or Firm*—Roger J. Drew; Elwood J. Schaffer

[57] ABSTRACT

Non-cyanide alkaline aqueous solutions for stripping non-ferrous metals, especially copper, from ferrous metal such as, for example, steel. The stripper solution comprises a water-soluble nitrate, a water-soluble compound of the formula

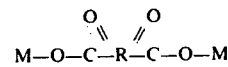

wherein R represents a valence bond, $-(CH_2)_x-$ wherein $x$ is an integer of 1 to 2,

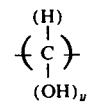

wherein $y$ is an integer of 1 to 2, or

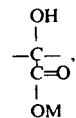

and M is a compatible, hydrophilic, i.e. water-loving or water-solibilizing, cation, a water-soluble persulfate, a water-soluble urea compound, and ammonium hydroxide. Brass, cadmium and zinc can also be stripped from steel by the stripper or dissolving solutions herein.

20 Claims, No Drawings

NON-CYANIDE ALKALINE COMPOSITION FOR DISSOLVING NON-FERROUS METALS

BACKGROUND OF THE INVENTION

1. Field of the Invention

This invention relates to the dissolving of nonferrous metal, and more particularly to new and improved compositions for dissolving non-ferrous metal. Additionally this invention relates to a process for the dissolution of non-ferrous metal.

2. Description of the Prior Art

Stripping solutions are known in the prior art which consist of an aqueous solution of ammonium persulfate and ammonium carbonate. Although such stripping solutions are satisfactory in certain respects, they suffer from having a low capacity for copper and having a tendency to go "dead" when only about 2-8 oz./gal. of copper has passed into solution and usually when about 4 oz./gal. of copper has been dissolved. By the solution going dead as the term is used herein is meant the stripping rate becomes so low that it is impractical to use the solution any further for stripping or dissolving the metal, and the solution is dumped to the sewer. Further such prior stripping solutions have a non-uniform stripping rate, and the ammonium persulfate is unstable and tends to decompose in the solution.

Nitric acid is known to be a good stripper for copper, but it is disadvantageous for stripping copper from ferrous metal, for instance steel, as the nitric acid is not selective for the copper and also attacks the steel. The nitric acid also evolves dense, noxious fumes when dissolving copper.

OBJECTS OF THE INVENTION

One object of this invention is to provide new and improved solutions for dissolving or stripping non-ferrous metal, e.g. copper, characterized by having a significantly higher capacity for the metal than that of the prior art dissolving or stripping solutions.

Another object of this invention is to provide new and improved solutions for dissolving or stripping non-ferrous metal, e.g. copper, having a uniform and constant stripping or etch rate for the copper until the total copper capacity of the solution is reached.

A further object is to provide new and improved solutions for stripping non-ferrous metal, e.g. copper, from a ferrous metal, e.g. steel, substrate without any substantial attack on the substrate.

Still a further object of the invention is to provide new and improved stripping solutions for dissolving or stripping a non-ferrous metal characterized by being stable solutions not having a tendency to undergo premature decomposition.

An additional object is to provide non-cyanide compositions utilizable for preparing the new and improved noncyanide stripping or dissolving solutions herein.

Additional objects and advantages will be apparent as the invention is hereinafter described in more detail.

BRIEF SUMMARY OF THE INVENTION

The non-cyanide alkaline solution for dissolving or stripping non-ferrous metal in accordance with this invention, in its broader aspects, comprises a water-soluble nitrate, a water-soluble compound of the formula

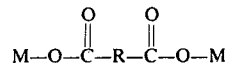

wherein R is a valence bond, $-(CH_2)_x-$
wherein x is an integer of 1 to 2,

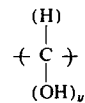

wherein y is an integer of 1 to 2, or

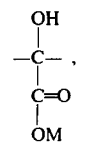

and M is a hydrophilic, i.e. water-loving or water-solubilizing, cation, a water-soluble persulfate, a water-soluble urea compound, i.e. urea per se or a urea derivative as exemplified by the derivatives of urea hereinafter disclosed, and ammonium hydroxide. Such dissolution or stripping solutions attain fully the objects hereafter set forth.

The considerably higher capacity of the dissolution or stripping solutions of the invention for copper than that of the prior art stripping solutions was a capacity of 14–18 oz./gal. of copper for the invention solutions, as contrasted with only a 2–8 oz./gal. of copper capacity reported in the prior art. This striking improvement in copper capacity provided by the stripping solutions of this invention was entirely unexpected and surprising.

The combination of the water-soluble persulfate and water-soluble nitrate herein unexpectedly resulted in a pronounced synergism and a considerably more constant stripping rate, than when either such constituent was utilized in the dissolution solution and the other such constituent was omitted. Further the soluble nitrate gives the dissolution or stripping solution a considerably enhanced capacity for and tolerance to dissolved or stripped copper without going dead which was not previously enjoyed with the soluble persulfate alone in the dissolution solution. The soluble salt of the dicarboxylic acid, e.g. the water-soluble oxalate, malonate or succinate, functions to chelate the stripped or dissolved metal, for instance the stripped copper. Such salt of the dicarboxylic acid is also believed to play a secondary role in the dissolution solutions herein, which is to stabilize the water-soluble persulfate, e.g. the ammonium persulfate, by a mechanism which is presently unknown. The function of the urea or urea derivative in the dissolution solutions herein is to complex the stripped copper, to thereby hold the copper in solution. In the absence of the urea or urea derivative, the dissolution or stripping solution will tolerate or hold considerably less copper. The uncomplexed, "untolerated" copper tends to precipitate as an insoluble copper oxide or salt, which is undesirable. The ammonium hydroxide, in addition to its pH adjusting function, functions also to complex the stripped copper ions as a soluble complex.

The dissolution or stripping solutions herein when held in a covered container, ordinarily do not require the addition thereto of ammonium hydroxide for maintaining the pH during the stripping operation. The maintenance of the pH of the stripping solutions herein within the range of about 9–10 is important inasmuch as at much below a pH of 9, steel substrates may be attacked by the solution which usually results in a part or component which must be scrapped.

The water-soluble nitrate is usually present in the dissolution or stripper solutions of this invention in amount of about 15 to about 85 g/l, the water-soluble compound of the formula $$M-O-\overset{O}{\underset{\|}{C}}-R-\overset{O}{\underset{\|}{C}}-O-M$$

wherein R and M have the meaning aforesaid is usually present therein in amount of about 0.1 to about 20 g/l, the water-soluble persulfate is usually present therein in amount of about 17 to about 220 g/l, the water-soluble urea compound is usually present therein in amount of about 1 to about 65 g/l, and the ammonium hydroxide is present therein in amount sufficient to adjust the pH to within the range about 9 to about 10.

Any water-soluble nitrate that is compatible in the stripping solutions herein is utilizable in the metal dissolving or stripping solutions herein. Exemplary of the water-soluble nitrate is ammonium nitrate or an alkali metal nitrate, e.g. potassium nitrate, sodium nitrate or lithium nitrate. Likewise any water-soluble persulfate that is compatible in the stripping solutions herein is utilizable in the metal dissolving or stripping solutions herein. Exemplary of the water-soluble persulfate is ammonium persulfate or an alkali metal persulfate such as potassium persulfate. Any water-soluble urea compound, i.e. urea per se or a water-soluble derivative of urea as exemplified by the water-soluble urea derivatives hereinafter set forth, that is compatible in the stripping solutions herein is utilizable in the stripping solutions herein.

The water-soluble urea compound is usually of the formula

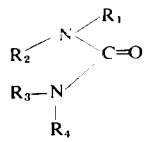

ps wherein $R_1$, $R_2$, $R_3$ and $R_4$ are hydrogen, lower alkyl, i.e. 1–4 C alkyl, phenyl, and substituted phenyl.

In the compound of the formula

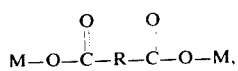

M can be any suitable solution-compatible hydrophilic cation. Thus M in such formula is exemplified by an ammonium cation or by an alkali metal, e.g. potassium, sodium or lithium, cation. Exemplary of such compounds are ammonium oxalate, potassium oxalate, sodium oxalate or lithium oxalate, ammonium malonate, potassium malonate, sodium malonate or lithium malonate, ammonium succinate, potassium succinate, sodium succinate and lithium succinate, Rochelle salt, i.e. sodium potassium tartrate, and sodium citrate.

The urea compounds herein are exemplified by urea per se, 1, 1-dimethylurea; 1, 3-dimethyl-urea; 1, 1-diethylurea; 1, 3-diethylurea; 1-ethylurea, 1-methylurea, 1-butylurea, 1, 1, 3-trimethylurea; 1, 3-dimethyl-1, 3-diphenylurea; 1-ethyl-1-phenylurea, 1-phenylurea and 1-(3-tolyl)-urea.

In another embodiment, the dissolution or stripping solutions herein may contain, as additional constituents, a water-soluble carbonate in amount up to about 45 g/l (calculated as ammonium carbonate), a water-soluble chloride in amount up to about 65 g/l (calculated as ammonium chloride), a water-soluble formate in amount up to about 25 g/l (calculated as ammonium formate), and a water-soluble citrate in amount up to about 30 g/l (calculated as ammonium citrate). Such solutions usually contain the constituents, when present therein, in proportions within the following proportion ranges:

| | g/l |
|---|---|
| Water-soluble nitrate (calculated as ammonium nitrate) | about 20 - about 80 |
| Water-soluble compound of the formula $M-O-\overset{O}{\underset{\|}{C}}-R-\overset{O}{\underset{\|}{C}}-O-M$ wherein R and M have the meaning aforesaid (calculated as ammonium oxalate) | about 0.1 to about 20 |
| Water-soluble carbonate (calculated as ammonium carbonate) | 0 to about 45 |
| Water-soluble persulfate (calculated as ammonium persulfate) | about 17 to about 220 |
| Water-soluble chloride (calculated as ammonium chloride | 0 to about 65 |
| Water-soluble formate (calculated as ammonium formate) | 0 to about 25 |
| Water-soluble urea compound (calculated as urea) | about 1 to about 65 |
| Water-soluble citrate (calculated as ammonium citrate) | 0 to about 30 |
| Ammonium hydroxide | sufficient to adjust pH to about 9 to about 10 |

The designation "g/l" herein and in the appended claims means gram or grams of the particular constituent per liter of the stripping solution.

When the water-soluble salts of the solutions herein are the preferred ammonium salts, the dissolution or stripping solutions herein contain the following constituents in proportions within the proportion ranges hereafter set forth.

| | g/l |
|---|---|
| Ammonium nitrate | about 20 to about 80 |
| Compound of the formula $M-O-\overset{O}{\underset{\|}{C}}-R-\overset{O}{\underset{\|}{C}}-O-M$ wherein M is ammonium (calculated as ammonium oxalyte | about 0.1 to about 20 |
| Ammonium carbonate | 0 to about 45 |
| Ammonium persulfate | about 17 to about 220 |
| Ammonium chloride | 0 to about 65 |
| Ammonium formate | 0 to about 25 |
| Water-soluble urea compound (calculated as urea) | about 1 to about 65 |
| Ammonium citrate | 0 to about 30 |
| Ammonium hydroxide | sufficient to adjust pH to about 9 to about 10 |

Exemplary water-soluble carbonates for use herein are ammonium carbonate and alkali metal carbonates, e.g. sodium carbonate, potassium carbonate and lithium carbonate.

The water-soluble formates are exemplified by ammonium formate and alkali metal formates, e.g. sodium formate potassium formate and lithium formate.

The water-soluble chlorides are exemplified by ammonium chloride and alkali metal chloride, e.g. potassium chloride, sodium chloride and lithium chloride.

The water-soluble citrate is exemplified by diammonium citrate and tri-ammonium citrate and alkali metal citrates, e.g. potassium citrate, monobasic potassium citrate, sodium citrate dihydrate, sodium citrate pentahydrate, sodium citrate (2 $Na_3C_6H_5O_7 \cdot 11H_2O$), and lithium citrate.

Liquid concentrate compositions for use in preparing the metal dissolving or stripping solutions herein also are embodied in the present invention. One such concentrate composition herein comprises an aqueous solution containing the water-soluble urea compound, the water-soluble nitrate, and water and preferably also water-soluble carbonate, all of these constituents being hereinbefore disclosed. The water-soluble chloride, formate and citrate, when utilized, will usually be present in the liquid concentrate herein, although such compounds can be present, if desired, in either or both of the liquid and solid concentrate compositions herein.

Another concentrate composition of this invention for use in preparing the metal dissolving or stripping solutions is the solid concentrate composition comprising a mixture of the compound of the formula $$M-O-\overset{O}{\underset{\|}{C}}-R-\overset{O}{\underset{\|}{C}}-O-M$$

wherein R and M have the meaning aforesaid, and the water-soluble persulfate, and preferably also the water-soluble carbonate.

The dissolution or stripping compositions of this invention are usually prepared by mixing together the two concentrate compositions previously disclosed herein and water in a predetermined ratio, to form the ready-to-use solution. The liquid concentrate composition or solution will usually contain the following constituents in proportions within the following percentage ranges:

| | % by Weight |
|---|---|
| Water-soluble urea compound (calculated as urea) | about 5 to about 25 |
| Water-soluble nitrate (calculated as ammonium nitrate) | about 15 to about 45 |
| Water-soluble chloride (calculated as ammonium chloride) | 0 to about 15 |
| Water-soluble formate (calculated as ammonium formate) | 0 to about 10 |
| Water-soluble citrate (calculated as ammonium citrate) | 0 to about 10 |
| $H_2O$ | about 30 to about 75 |

In an additional embodiment of the liquid concentrate solution, the concentrate solution contains the constituents and in the proportion ranges set forth immediately supra and, as a preferred additional constituent, a water-soluble carbonate in amount of about 1 to about 5 percent by weight (calculated as ammonium carbonate) based on total concentrate solution.

The solid concentrate composition, which is ordinarily a powder concentrate, will usually contain the following constituents in proportions within the following ranges:

| | % by Weight |
|---|---|
| Water-soluble persulfate (calculated as ammonium persulfate) | about 30 to about 90 |
| Compound of the formula 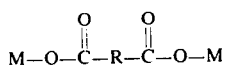 wherein R and M have the meaning aforesaid (calculated as ammonium oxalate) | about 2 to about 15 |
| Water-soluble chloride (calculated as ammonium chloride) | 0 to about 15 |
| Water-soluble formate (calculated as ammonium formate) | 0 to about 10 |
| Water-soluble citrate (calculated as ammonium citrate) | 0 to about 10 |

In an additional embodiment of the solid concentrate composition, the solid concentrate contains the constituents and in the proportion ranges set forth immediately supra and, as a preferred additional constituent, a water-soluble carbonate in amount of about 5 to about 25 percent by weight (calculated as ammonium carbonate) based on total concentrate composition.

The liquid and solid concentrates and water are mixed together to form the ready-to-use dissolution solution in proportions usually in the ranges of about 12–39 percent of the liquid concentrate, about 3.0–9.0 percent of the solid concentrate, and about 30.0–80.0 percent of water, the percentages being by weight. $NH_4OH$ is also admixed with the concentrates and water in amount sufficient to adjust the pH to within the range of about 9 to about 10.

The metal dissolving or stripping solutions herein can, if desired, be prepared by admixing the constituents in proportions within the proportion ranges disclosed herein, and without employing the liquid and solid concentrate solutions.

The dissolving process herein involves contacting the non-ferrous metal to be dissolved with the dissolving solution herein, and maintaining the metal in contact with the solution until the metal is dissolved therein. Any suitable means of contacting the non-ferrous metal with the solution is utilizable. The non-ferrous metal is usually contacted with the dissolving solution by immersing the metal therein. However, additional examples of such contacting is by pouring the dissolving solution onto the metal, or by spraying the dissolving solution onto the metal. The time of contacting the non-ferrous metal, e.g. copper, with the dissolving or stripping solutions herein to dissolve it from the ferrous substrate, will vary with the temperature of the stripping solution and the amount of non-ferrous metal to be dissolved or the thickness of the non-ferrous metal deposit to be stripped. The contact time required will be less when the dissolving or stripping solution is at higher temperature, for instance elevated temperature up to about 120°F., and the contact time required will be greater when the dissolving or stripping solution is at a lower temperature, for instance room temperature. A contact time of about 60 minutes was required to strip a metallic copper deposit of 1 mil thickness from a ferrous metal substrate with the stripping solution at room temperature and without agitation of the solution.

The dissolution of the non-ferrous metal in accordance with this invention can be effected with the dissolving solution at room temperature with good results. Elevated temperatures of the dissolving solution herein can also be utilized, with solution temperatures up to about 120°F. tending to speed up the dissolution of the non-ferrous metal. Although elevated solution temperatures up to about 120°F. as aforementioned give good results in dissolving or stripping the metal, the life of the dissolution or stripping solution may be lowered to some extent at the elevated solution temperatures.

The process herein is eminently well suited for dissolving the non-ferrous metal as such, i.e. not on a substrate, or for selectively stripping, i.e. dissolving, the non-ferrous metal from ferrous metal substrates.

DESCRIPTION OF THE PREFERRED EMBODIMENTS

A preferred stripping solution herein contains the following constituents within the proportion ranges specified:

|  | g/l |
|---|---|
| Ammonium nitrate | about 20 to about 80 |
| Ammonium oxalate | about 0.1 to about 20 |
| Ammonium carbonate | about 2 to about 45 |
| Ammonium persulfate | about 20 to about 220 |
| Urea | about 1 to about 50 |
| Ammonium hydroxide | sufficient to adjust the pH to about 9.5 - 10 |

An especially preferred stripping solution herein is set forth below:

|  | g/l |
|---|---|
| Ammonium nitrate | 60 |
| Ammonium oxalate | 6 |
| Ammonium carbonate | 15 |
| Ammonium persulfate | 45 |
| Urea | 30 |
| Ammonium hydroxide | 330 ml/l |

A preferred liquid concentrate herein contains the following constituents in proportions within the ranges hereafter set forth:

|  | % by Weight |
|---|---|
| Urea per se | about 10 to about 18 |
| Ammonium nitrate | about 20 to about 35 |
| H₂O | about 40 to about 60 |
| Ammonium carbonate | about 1 to about 5 |
| Ammonium chloride | 0 to about 15 |
| Ammonium formate | 0 to about 10 |
| Ammonium citrate | 0 to about 10 |

The powdered solid concentrate preferred herein contains the following constituents in proportions within the following ranges:

|  | % by Weight |
|---|---|
| Ammonium persulfate | about 60 to about 80 |
| Ammonium oxalate | about 6 to about 13 |
| Ammonium carbonate | about 10 to about 20 |
| Ammonium chloride | 0 to about 10 |
| Ammonium formate | 0 to about 10 |

The preferred liquid and solid concentrates, and water are mixed together to form the ready-to-use dissolution solution preferably in proportions within the ranges of about 16.6–20.0 percent of the liquid concentrate, about 4.0–8.0 percent of the solid concentrate, and about 50.0–70 percent of water. NH₄OH is also admixed with the concentrates and water in amount sufficient to adjust the solution pH to within the range of about 9 to about 10.

Ammonium nitrate is the preferred soluble nitrate for use herein inasmuch as the use of an alkali metal nitrate such as sodium nitrate results in the stripping solution having an appreciable drop in copper metal capacity. This, however, does not preclude the use of the alkali metal nitrates.

The following examples further illustrate the metal dissolving or stripping aqueous solutions of this invention.

EXAMPLE 1

|  | g/l |
|---|---|
| Ammonium nitrate | 60 |
| Ammonium oxalate | 6 |
| Ammonium carbonate | 15 |
| Ammonium persulfate | 45 |
| Urea | 30 |
| Ammonium hydroxide | sufficient to adjust pH to about 9.0 - 10.0 |

EXAMPLE 2

|  | g/l |
|---|---|
| Potassium nitrate | 40 |
| Potassium oxalate | 4 |
| Potassium carbonate | 12 |
| Potassium persulfate | 60 |
| Urea | 30 |
| Ammonium hydroxide | sufficient to adjust pH to about 9.0 - 10.0 |

EXAMPLE 3

|  | g/l |
|---|---|
| Ammonium nitrate | 40 |
| Ammonium oxalate | 10 |
| Ammonium carbonate | 45 |
| Ammonium persulfate | 45 |
| Urea | 30 |
| Ammonium hydroxide | Sufficient to adjust pH to about 9.0 - 10.0 |

EXAMPLE 4

|  | g/l |
|---|---|
| Ammonium nitrate | 60 |
| Ammonium oxalate | 8 |
| Ammonium carbonate | 45 |
| Ammonium persulfate | 45 |
| Urea | 20 |
| Ammonium hydroxide | Sufficient to adjust pH to about 9.0 - 10.0 |

EXAMPLE 5

|  | g/l |
|---|---|
| Ammonium nitrate | 60 |
| Ammonium oxalate | 4 |
| Ammonium carbonate | 45 |
| Ammonium persulfate | 45 |
| Ammonium chloride | 5 |
| Ammonium formate | 20 |
| Urea | 10 |
| Ammonium citrate | 10 |
| Ammonium hydroxide | Sufficient to adjust pH to about 9.0–10.0 |

EXAMPLE 6

|  | g/l |
|---|---|
| Ammonium nitrate | 60 |
| Ammonium malonate | 10 |
| Ammonium carbonate | 12 |
| Ammonium persulfate | 45 |
| Urea | 30 |
| Ammonium hydroxide | Sufficient to adjust pH to about 9.0 – 10.0 |

EXAMPLE 7

|  | g/l |
|---|---|
| Potassium nitrate | 40 |
| Potassium malonate | 8 |
| Potassium carbonate | 15 |
| Potassium persulfate | 40 |
| Urea | 25 |
| Ammonium hydroxide | Sufficient to adjust pH to about 9.0 – 10.0 |

EXAMPLE 8

|  | g/l |
|---|---|
| Ammonium nitrate | 60 |
| Ammonium succinate | 6 |
| Urea | 30 |
| Ammonium persulfate | 45 |
| Ammonium carbonate | 12 |
| Ammonium hydroxide | Sufficient to adjust pH to about 9.0 – 10.0 |

EXAMPLE 9

|  | g/l |
|---|---|
| Ammonium nitrate | 60 |
| Ammonium oxalate | 6 |
| Ammonium carbonate | 9 |
| Ammonium persulfate | 45 |
| Methylurea | 30 |
| Ammonium hydroxide | Sufficient to adjust pH to about 9.0 – 10.0 |

EXAMPLE 10

|  | g/l |
|---|---|
| Ammonium nitrate | 60 |
| Ammonium oxalate | 6 |
| Ammonium carbonate | 9 |
| Ammonium chloride | 5 |
| Ammonium persulfate | 45 |
| Ammonium formate | 2 |
| N, N¹ - diethylurea | 10 |
| Ammonium citrate | 10 |
| Ammonium hydroxide | Sufficient to adjust pH to about 9.0 – 10.0 |

EXAMPLE 11

|  | g/l |
|---|---|
| Ammonium nitrate | 60 |
| Ammonium oxalate | 6 |
| Ammonium carbonate | 9 |
| Ammonium persulfate | 45 |
| Methylurea | 10 |
| Ammonium hydroxide | Sufficient to adjust pH to about 9.0 – 10.0 |

EXAMPLE 12

|  | g/l |
|---|---|
| Ammonium nitrate | 60 |
| Ammonium oxalate | 8 |
| Ammonium carbonate | 12 |
| Ammonium persulfate | 60 |
| N, N - diethylurea | 10 |
| Ammonium hydroxide | Sufficient to adjust pH to about 9.0 – 10.0 |

EXAMPLE 13

|  | g/l |
|---|---|
| Ammonium nitrate | 60 |
| Ammonium oxalate | 9 |
| Ammonium carbonate | 13 |
| Ammonium persulfate | 59 |
| Butylurea | 12 |
| Ammonium hydroxide | Sufficient to adjust pH to about 9.0 – 10.0 |

EXAMPLE 14

|  | g/l |
|---|---|
| Ammonium nitrate | 60 |
| Ammonium oxalate | 8 |
| Ammonium carbonate | 12 |
| Ammonium persulfate | 60 |
| Phenylurea | 4 |
| Ammonium hydroxide | Sufficient to adjust pH to about 9.0 – 10.0 |

EXAMPLE 15

|  | g/l |
|---|---|
| Ammonium nitrate | 60 |
| Ammonium oxalate | 6 |
| Ammonium carbonate | 9 |
| Ammonium persulfate | 45 |
| Ethylurea | 30 |
| Ammonium hydroxide | Sufficient to adjust pH to about 9.0 – 10.0 |

EXAMPLE 16

|  | g/l |
|---|---|
| Ammonium nitrate | 60 |
| Ammonium oxalate | 8 |
| Ammonium carbonate | 12 |
| Ammonium persulfate | 60 |
| Methylurea | 10 |
| Ammonium hydroxide | Sufficient to adjust pH to about 9.0 – 10.0 |

EXAMPLE 17

|  | g/l |
|---|---|
| Potassium nitrate | 40 |
| Potassium oxalate | 8 |
| Potassium carbonate | 15 |
| Potassium persulfate | 45 |
| N, N¹ - dimethylurea | 10 |

EXAMPLE 18

|  | g/l |
|---|---|
| Potassium nitrate | 60 |
| Potassium malonate | 10 |
| Potassium carbonate | 15 |
| Potassium persulfate | 45 |
| Methylurea | 30 |
| Ammonium hydroxide | Sufficient to adjust pH to about 9.0 – 10.0 |

EXAMPLE 19

|  | g/l |
|---|---|
| Potassium nitrate | 60 |
| Potassium succinate | 6 |
| Potassium carbonate | 15 |
| Potassium persulfate | 45 |
| N, N - dimethylurea | 30 |
| Ammonium carbonate | Sufficient to adjust pH to about 9.0 – 10.0 |

EXAMPLE 20

|  | g/l |
|---|---|
| Potassium nitrate | 60 |
| Potassium oxalate | 6 |
| Potassium carbonate | 12 |
| Potassium persulfate | 60 |
| 1 - Phenylurea | 4 |
| Ammonium hydroxide | Sufficient to adjust pH to about 9.0 – 10.0 |

EXAMPLE 21

|  | g/l |
|---|---|
| Ammonium nitrate | 60 |
| Ammonium oxalate | 6 |
| Ammonium persulfate | 45 |
| Urea | 30 |
| Ammonium hydroxide | Sufficient to adjust pH to about 9.0 – 10.0 |

EXAMPLE 22 (Different proportions than Ex. 21)

|  | g/l |
|---|---|
| Ammonium nitrate | 45 |
| Ammonium oxalate | 6 |
| Ammonium persulfate | 40 |
| Urea | 30 |
| Ammonium hydroxide | Sufficient to adjust pH to about 9.0 – 10.0 |

EXAMPLE 23

|  | g/l |
|---|---|
| Potassium nitrate | 60 |
| Potassium oxalate | 6 |
| Potassium persulfate | 45 |
| Urea | 25 |
| Ammonium hydroxide | Sufficient to adjust pH to about 9.0 – 10.0 |

EXAMPLE 24

|  | g/l |
|---|---|
| Ammonium nitrate | 60 |
| Ammonium carbonate | 15 |
| Ammonium persulfate | 45 |
| Ammonium oxalate | 6 |
| Urea | 30 |
| Ammonium hydroxide | Sufficient to adjust pH to about 9.0 – 10.0 |

EXAMPLE 25

|  | g/l |
|---|---|
| Ammonium nitrate | 60 |
| Ammonium carbonate | 15 |
| Ammonium persulfate | 45 |
| Ammonium oxalate | 6 |
| Urea | 5 |
| Ammonium hydroxide | Sufficient to adjust pH to about 9.0 – 10.0 |

The stripping solution of Example 24 stripped, i.e. dissolved, 118 grams of copper from a steel substrate at a stripping rate of about 1 mil per hour at room temperature of the solution and without agitation of the solution. The stripping solution of Example 25 stripped 96.1 grams of copper from a steel substrate at a stripping rate of about 1 mil per hour with the solution at room temperature and without agitation of the solution. In both cases, the copper was stripped without corrosive attack of the steel substrate.

What is claimed is:

1. A non-cyanide alkaline aqueous solution for dissolving non-ferrous metal consisting essentially of about 15 to about 85 g/l of a water-soluble nitrate, about 0.1 to about 20 g/l of a water-soluble compound of the formula $$M-O-\overset{O}{\underset{}{C}}-R-\overset{O}{\underset{}{C}}-O-M$$

wherein R is selected from the group consisting of a valence bond, $+CH_2+_x$ wherein x is an integer of 1 to 2,

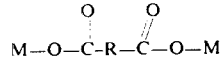

wherein y is an integer of 1 to 2, and

and M is a hydrophilic cation, about 17 to about 220 g/l of a water-soluble persulfate, about 1 to about 65 g/l of a water-soluble urea compound, and ammonium hydroxide in amount sufficient to adjust the pH to within the range of about 9 to about 10.

2. The solution of claim 1 also containing a water-soluble carbonate.

3. The solution of claim 1 wherein the soluble urea compound is of the formula

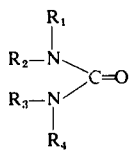

wherein $R_1$, $R_2$, $R_3$ and $R_4$ are hydrogen, lower alkyl, phenyl or substituted phenyl.

4. The solution of claim 2 wherein the water-soluble nitrate is selected from the group consisting of nitrates of ammonium and an alkali metal, M of the compound of the formula

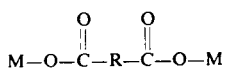

is selected from the group consisting of alkali metal and ammonium cations, the water-soluble persulfate is selected from the group consisting of persulfates of ammonium and an alkali metal, and the water-soluble carbonate is selected from the group consisting of carbonates of ammonium and an alkali metal.

5. The solution of claim 4 wherein the water-soluble nitrate is ammonium nitrate, M of the formula

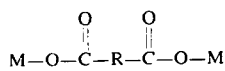

is an ammonium cation, the water-soluble persulfate is ammonium persulfate, $R_1$, $R_2$, $R_3$ and $R_4$ of the compound of the formula

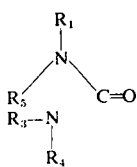

are each a hydrogen atom, and the water-soluble carbonate is ammonium carbonate.

6. The solution of claim 4 also containing a water-soluble chloride, a water-soluble formate, and a water-soluble citrate.

7. The solution of claim 6 wherein the water-soluble chloride is selected from the group consisting of chlorides of ammonium and an alkali metal, and the water-soluble citrate is selected from the group consisting of citrates of ammonium and of an alkali metal.

8. The solution of claim 7 wherein the water-soluble chloride is ammonium chloride, the water-soluble formate is ammonium formate, and the water-soluble citrate is ammonium citrate.

9. A non-cyanide alkaline aqueous solution for dissolving non-ferrous metal comprising the following constituents in proportions within the proportion ranges

| | g/l |
|---|---|
| Water-soluble nitrate (calculated as ammonium nitrate) | about 20 to about 80 |
| Water-soluble compound of the formula $M-O-\overset{O}{\underset{\|}{C}}-R-\overset{O}{\underset{\|}{C}}-O-M$ wherein R is selected from the group consisting of a valence bond, $-(CH_2)_x-$ wherein x is an integer of 1 to 2, $-\overset{(H)}{\underset{(OH)_y}{C}}-$ wherein y is an integer of 1 to 2, and $-\overset{OH}{\underset{\underset{OM}{\overset{\|}{C=O}}}{\overset{\|}{C}}}-$ and M is a hydrophilic cation (calculated as ammonium oxalate) | about 0.1 to about 20 |
| Water-soluble carbonate (calculated as ammonium carbonate) | 0 to about 45 |
| Water-soluble persulfate (calculated as ammonium persulfate | about 17 to about 220 |
| Water-soluble chloride (calculated as ammonium chloride) | 0 to about 65 |
| Water-soluble formate (calculated as ammonium formate) | 0 to about 25 |
| Water-soluble urea compound (calculated as urea) | about 1 to about 65 |
| Water-soluble citrate (calculated as ammonium citrate) | 0 to about 30 |
| Ammonium hydroxide | Sufficient to adjust pH to about 9 to about 10 |

10. The solution of claim 9 wherein the water-soluble nitrate is selected from the group consisting of nitrates of ammonium and an alkali metal, M of the formula

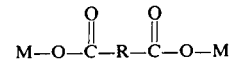

is selected from the group consisting of ammonium and alkali metal cations, the water-soluble carbonate is selected from the group consisting of carbonates of ammonium and an alkali metal, the water-soluble persulfate is selected from the group consisting of persulfates of ammonium and an alkali metal, the water-soluble chloride is selected from the group consisting of chlorides of ammonium and an alkali metal, the water-soluble formate is selected from the group consisting of formates of ammonium and an alkali metal, and the water-soluble citrate is selected from the group consisting of citrates of ammonium and an alkali metal.

11. The solution of claim 9 wherein the water-soluble urea compound is urea.

12. The composition of claim 10 wherein the water-soluble nitrate is ammonium nitrate, R of the compound of the formula

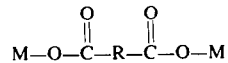

is a valence bond and M is an ammonium cation, the water-soluble carbonate is ammonium carbonate, the water-soluble persulfate is ammonium persulfate, the water-soluble chloride is ammonium chloride, the water-soluble formate is ammonium formate, and the water-soluble citrate is an ammonium citrate.

13. A concentrate composition comprising a mixture, by weight, of about 2 percent to about 15 percent of a compound of the formula $$M-O-\overset{O}{\underset{\|}{C}}-R-\overset{O}{\underset{\|}{C}}-O-M$$

wherein R represents a valence bond, $+CH_2+_x$ wherein x is an integer of 1 to 2, $$+\underset{(OH)_y}{\overset{(H)}{C}}+$$

wherein y is an integer of 1 to 2, or $$-\underset{\underset{OM}{\overset{|}{C=O}}}{\overset{OH}{\overset{|}{C}-}},$$

and M is a hydrophilic cation (calculated as ammonium oxalate), and about 30 percent to about 90 percent of a water-soluble persulfate (calculated as ammonium persulfate).

14. The concentrate of claim 13 also containing, by weight, about 5 percent to about 25 percent of a water-soluble carbonate (calculated as ammonium carbonate) based on total concentrate.

15. A solid concentrate composition consisting essentially of a mixture of the following constituents in proportions within the proportion ranges hereafter specified:

| | % by Weight |
|---|---|
| Water-soluble persulfate (calculated as ammonium persulfate | about 30 to about 90 |
| Compound of the formula $M-O-\overset{O}{\underset{\|}{C}}-R-\overset{O}{\underset{\|}{C}}-O-M$ wherein R is selected from the group consisting of a valence bond, $+CH_2+_x$ wherein x is an integer of 1 to 2, $+\underset{(OH)_y}{\overset{(H)}{C}}+$ wherein y is an integer of 1 to 2, and $-\underset{\underset{OM}{\overset{|}{C=O}}}{\overset{OH}{\overset{|}{C}}}-$ and M is a hydrophilic cation (calculated as ammonium oxalate) | about 2 to about 15 |
| Water-soluble chloride (calculated as ammonium chloride) | 0 to about 15 |
| Water-soluble formate (calculated as ammonium formate) | 0 to about 10 |
| Water-soluble citrate (calculated as ammonium citrate) | 0 to about 10. |

16. The concentrate of claim 15 also containing a water-soluble carbonate in amount of about 5 percent to about 25 percent by weight (calculated as ammonium carbonate) based on total concentrate.

17. A liquid concentrate composition comprising an aqueous solution containing a water-soluble urea compound, a water-soluble nitrate, and water.

18. The concentrate of claim 17 also containing a water-soluble carbonate.

19. A liquid concentrate composition consisting essentially of an aqueous solution containing the following constituents in proportions within the proportion ranges hereafter specified:

| | % by Weight |
|---|---|
| Water-soluble urea compound (calculated as urea) | about 5 to about 25 |
| Water-soluble nitrate (calculated as ammonium nitrate) | about 15 to about 45 |
| Water-soluble chloride (calculated as ammonium chloride) | 0 to about 15 |
| Water-soluble formate (calculated as ammonium formate) | 0 to about 10 |
| Water-soluble citrate (calculated as ammonium citrate) | 0 to about 10 |
| $H_2O$ | about 30 to about 75 |

20. The concentrate of claim 19 also containing a water-soluble carbonate in amount of about 1 percent to about 5 percent by weight (calculated as ammonium carbonate) based on total concentrate.

* * * * *